US012614312B2

(12) United States Patent
Krawciw et al.

(10) Patent No.: US 12,614,312 B2
(45) Date of Patent: Apr. 28, 2026

(54) SYSTEMS, METHODS, AND INTERFACES FOR COMPARING COMPLEX COATING MIXTURES WITH SPARKLE COLOR

(71) Applicant: PPG Industries Ohio, Inc., Cleveland, OH (US)

(72) Inventors: A'Lisa M. Krawciw, Madison Heights, MI (US); Anthony J. Foderaro, Parma, OH (US); Alison M. Norris, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 223 days.

(21) Appl. No.: 18/548,267

(22) PCT Filed: Mar. 1, 2022

(86) PCT No.: PCT/US2022/070883
§ 371 (c)(1),
(2) Date: Aug. 29, 2023

(87) PCT Pub. No.: WO2022/187806
PCT Pub. Date: Sep. 9, 2022

(65) Prior Publication Data
US 2024/0135588 A1 Apr. 25, 2024
US 2024/0233188 A9 Jul. 11, 2024

Related U.S. Application Data

(60) Provisional application No. 63/155,569, filed on Mar. 2, 2021.

(51) Int. Cl.
*G06K 9/00* (2022.01)
*G06T 7/90* (2017.01)
(Continued)

(52) U.S. Cl.
CPC ................ *G06T 7/90* (2017.01); *G06V 10/56* (2022.01); *G06V 10/761* (2022.01); *G06T 2207/10024* (2013.01)

(58) Field of Classification Search
CPC ............. G06T 7/90; G06T 2207/10024; G06T 2207/20076; G06T 2207/30156; G06V 10/56; G06V 10/761
See application file for complete search history.

(56) References Cited

U.S. PATENT DOCUMENTS 6,975,404 B2    12/2005    Schwarz
7,466,415 B2    12/2008    Gibson et al.
(Continued)

FOREIGN PATENT DOCUMENTS

CN        106716243 A        5/2017
CN        107003184 A        8/2017
(Continued)

OTHER PUBLICATIONS

International Search Report and Written Opinion received for PCT Application Serial No. PCT/US2022/070883 dated Jun. 15, 2022, 11 pages.

*Primary Examiner* — Duy M Dang

(57) ABSTRACT

A computer system for comparing complex coating mixtures with sparkle color can receive at least one image of a target coating. The computer system calculates a sparkle color distribution of the at least one image of the target coating, wherein the sparkle color distribution represents a relative number of sparkle points of one color compared to a number of sparkle points of one or more other colors in a measured area. Further, the computer system searches a database for a plurality of reference coatings with sparkle color distributions that match the sparkle color distribution of the target coating, wherein each reference coating in the plurality has a different sparkle color distribution. The computer system (Continued)

calculates a degree to which the plurality of reference coatings matches the target coating based on sparkle color distribution. Finally, the computer system identifies a closest matching reference coating from the plurality of reference coatings.

20 Claims, 7 Drawing Sheets

(51) Int. Cl.
  G06V 10/56          (2022.01)
  G06V 10/74          (2022.01)

(56)                    References Cited

U.S. PATENT DOCUMENTS

| | | | |
|---|---|---|---|
| 8,407,014 | B2 | 3/2013 | Prakash et al. |
| 9,607,403 | B2 | 3/2017 | Beymore et al. |
| 9,734,590 | B2 | 8/2017 | Prakash |
| 10,697,833 | B2 | 6/2020 | Vignolo et al. |
| 2014/0242271 | A1 | 8/2014 | Prakash et al. |
| 2016/0005187 | A1 | 1/2016 | Prakash |
| 2016/0088278 | A1 | 3/2016 | Velarde et al. |
| 2017/0200288 | A1 | 7/2017 | Beymore et al. |
| 2019/0332254 | A1 | 10/2019 | Norris et al. |

FOREIGN PATENT DOCUMENTS

| | | |
|---|---|---|
| CN | 108700466 A | 10/2018 |
| JP | 2020-094936 A | 6/2020 |
| WO | 2015070128 A1 | 5/2015 |
| WO | 2018/041727 A1 | 3/2018 |
| WO | 2020/157244 A1 | 8/2020 |

_200_

_300_

TABLE III

Z-Score vs. Color Bucket
Physical Type

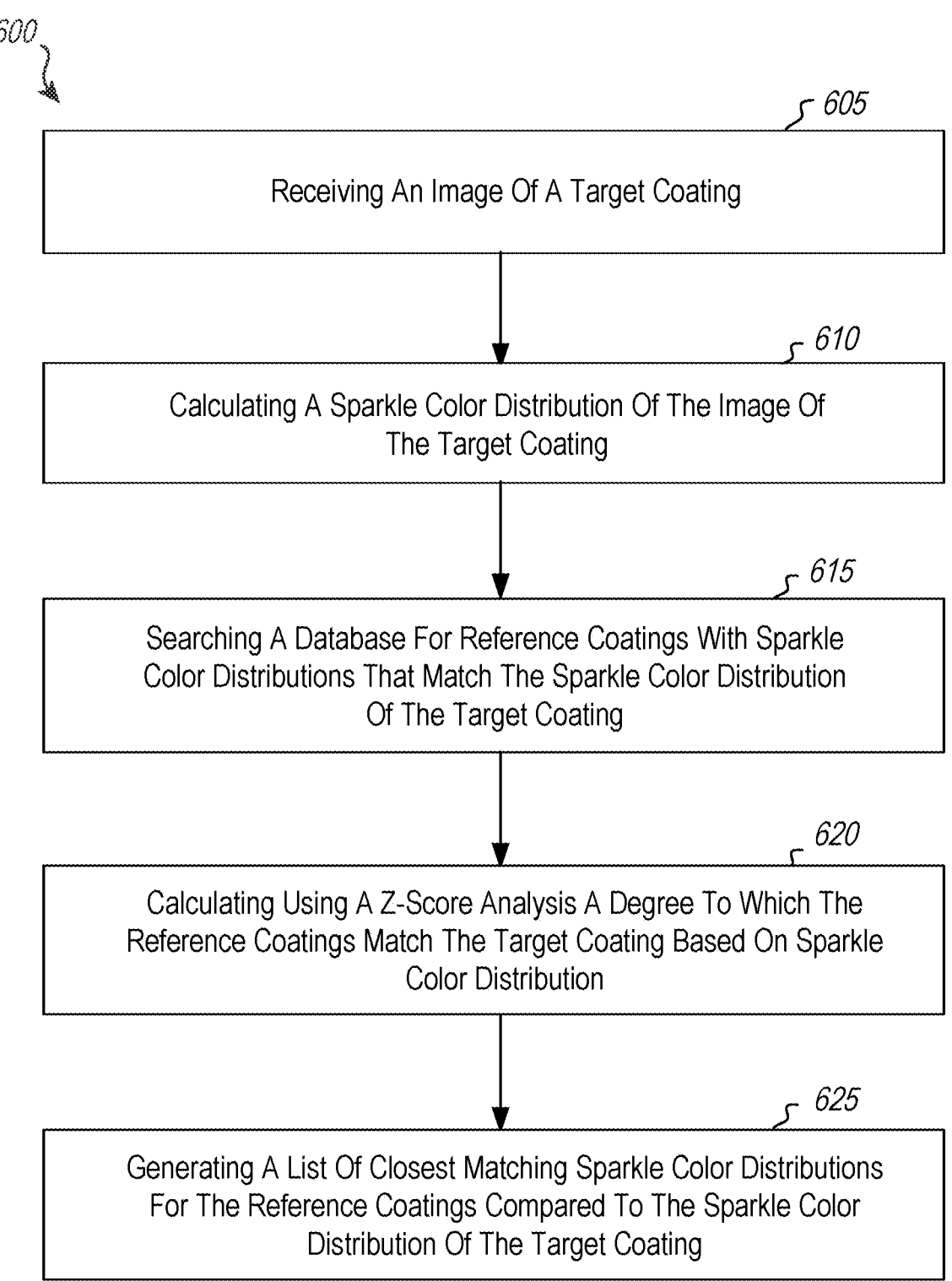

*600*

*605*

Receiving An Image Of A Target Coating

*610*

Calculating A Sparkle Color Distribution Of The Image Of
The Target Coating

*615*

Searching A Database For Reference Coatings With Sparkle
Color Distributions That Match The Sparkle Color Distribution
Of The Target Coating

*620*

Calculating Using A Z-Score Analysis A Degree To Which The
Reference Coatings Match The Target Coating Based On Sparkle
Color Distribution

*625*

Generating A List Of Closest Matching Sparkle Color Distributions
For The Reference Coatings Compared To The Sparkle Color
Distribution Of The Target Coating

*FIG. 6*

SYSTEMS, METHODS, AND INTERFACES FOR COMPARING COMPLEX COATING MIXTURES WITH SPARKLE COLOR

CROSS-REFERENCE TO RELATED APPLICATIONS

This application claims the benefit of and priority to United States Provisional Patent Application Ser. No. 63/155,569 filed on 2 March 2021 and entitled "SYSTEMS, METHODS, AND INTERFACES FOR COMPARING COMPLEX COATING MIXTURES WITH SPARKLE COLOR," which application is expressly incorporated herein by reference in its entirety.

BACKGROUND

Modern coatings provide several important functions in industry and society. Coatings can protect a coated material from corrosion, such as rust. Coatings can also provide an aesthetic function by providing a particular color and/or texture to an object. For example, most automobiles are coated using paints and various other coatings in order to protect the metal body of the automobile from the elements and also to provide aesthetic visual effects.

In view of the wide-ranging uses for different coatings, it is often necessary to identify a target coating composition. For instance, it might be necessary to identify a target coating composition on an automobile that has been in an accident. However, due to the nature of complex mixtures within coatings, it is sometimes difficult to formulate, identify, and/or search for acceptable matching formulations and/or pigmentations. In an ideal setting, an individual could view a complex coating mixture and determine the appropriate pigments within the coating mixture. In reality, the pigments in a coating mixture may not be readily available in a set of toners of a paint system that is to be utilized to make a matching coating. Thus, a skilled color matcher has to make a determination as to whether the paint system contains appropriate offsets and, if so, must determine additional changes which need to be made to accommodate the offsets given that they are not identical matches to the original pigmentation.

A hypothetical solution to determining the composition of an unknown pigmentation is to read the unknown with a device that can search a database for the best matching coating formula within the database (or a device that can immediately create a new coating formula). However, such a solution is only hypothetical because systems are able to determine color or bulk effect pigment type, but generally cannot assist in determination of, for example, the specific pearl necessary for a coating formulation match.

Thus, there are many opportunities for new methods and systems that improve the identification of coatings. When a vehicle undergoes repair, a repair paint is applied to the vehicle, which should match the original paint.

BRIEF SUMMARY

The systems, methods, and computer program products described herein can provide significant improvements to coating formulation methods. For example, the present invention includes a system for comparing complex coating mixtures with sparkle color. The present invention also includes computer-implemented methods of comparing complex coating mixtures with sparkle color, and related computer-program products. Accordingly, the computer systems and methods disclosed herein can provide a solution that can identify special effect pigments and generalize the ratios of those pigments, thus enabling faster and better color matching while providing a color match that may be of higher quality.

For example, a computer system for comparing complex coating mixtures with sparkle color can be configured to receive at least one image of a target coating. The computer system can also calculate a sparkle color distribution of the at least one image of the target coating, wherein the sparkle color distribution represents a relative number of sparkle points of one color compared to a number of sparkle points of one or more other colors in a measured area. Further, the computer system can search a database for a plurality of reference coatings with sparkle color distributions that match the sparkle color distribution of the target coating, wherein each reference coating in the plurality has a different sparkle color distribution. The computer system can calculate a degree to which the plurality of reference coatings matches the target coating based on sparkle color distribution. Furthermore, the computer system can identify a closest matching reference coating from the plurality of reference coatings.

In addition, a computerized method of comparing complex coating mixtures with sparkle color can comprise receiving at least one image of a target coating. Also, the method can include calculating a sparkle color distribution of the at least one image of the target coating, wherein the sparkle color distribution represents a relative number of sparkle points of one color compared to a number of sparkle points of one or more other colors in a measured area. The method can further include searching a database for a plurality of reference coatings with sparkle color distributions that match the sparkle color distribution of the target coating, wherein each reference coating in the plurality has a different sparkle color distribution. The method can comprise calculating a degree to which the plurality of reference coatings matches the target coating based on sparkle color distribution. Furthermore, the method can comprise generating a list of closest matching sparkle color distributions for the plurality of reference coatings compared to the sparkle color distribution of the target coating.

Furthermore, another computerized method of comparing complex coating mixtures with sparkle color can comprise calculating a sparkle color distribution of the at least one image of the target coating, wherein the sparkle color distribution represents a relative number of sparkle points of one color compared to a number of sparkle points of one or more other colors in a measured area. The method can also comprise searching a database for a plurality of reference coatings with sparkle color distributions that match the sparkle color distribution of the target coating. In addition, the method can include calculating using a z-score analysis a degree to which the plurality of reference coatings matches the target coating based on sparkle color distribution. Furthermore, the method can include generating a list of closest matching sparkle color distributions for the plurality of reference coatings compared to the sparkle color distribution of the target coating.

Additional features and advantages will be set forth in the description which follows, and in part will be obvious from the description, or may be learned by practice. The features and advantages may be realized and obtained by means of the instruments and combinations particularly pointed out in the appended claims and aspects. These and other features will become more fully apparent from the following description and appended claims, or may be learned by the practice of the examples as set forth hereinafter.

BRIEF DESCRIPTION OF THE DRAWINGS

In order to describe the manner in which the above recited and other advantages and features can be obtained, a more particular description briefly described above will be rendered by reference to specific examples thereof, which are illustrated in the appended drawings. Understanding that these drawings are merely illustrative and are not therefore to be considered to be limiting of its scope, the computer system for dynamically parsing a digital image to identify coating colors will be described and explained with additional specificity and detail through the use of the accompanying drawings in which:

FIG. 6 depicts a flow chart of steps within an alternative method for comparing complex mixtures with sparkle color.

DETAILED DESCRIPTION

Figure 1:
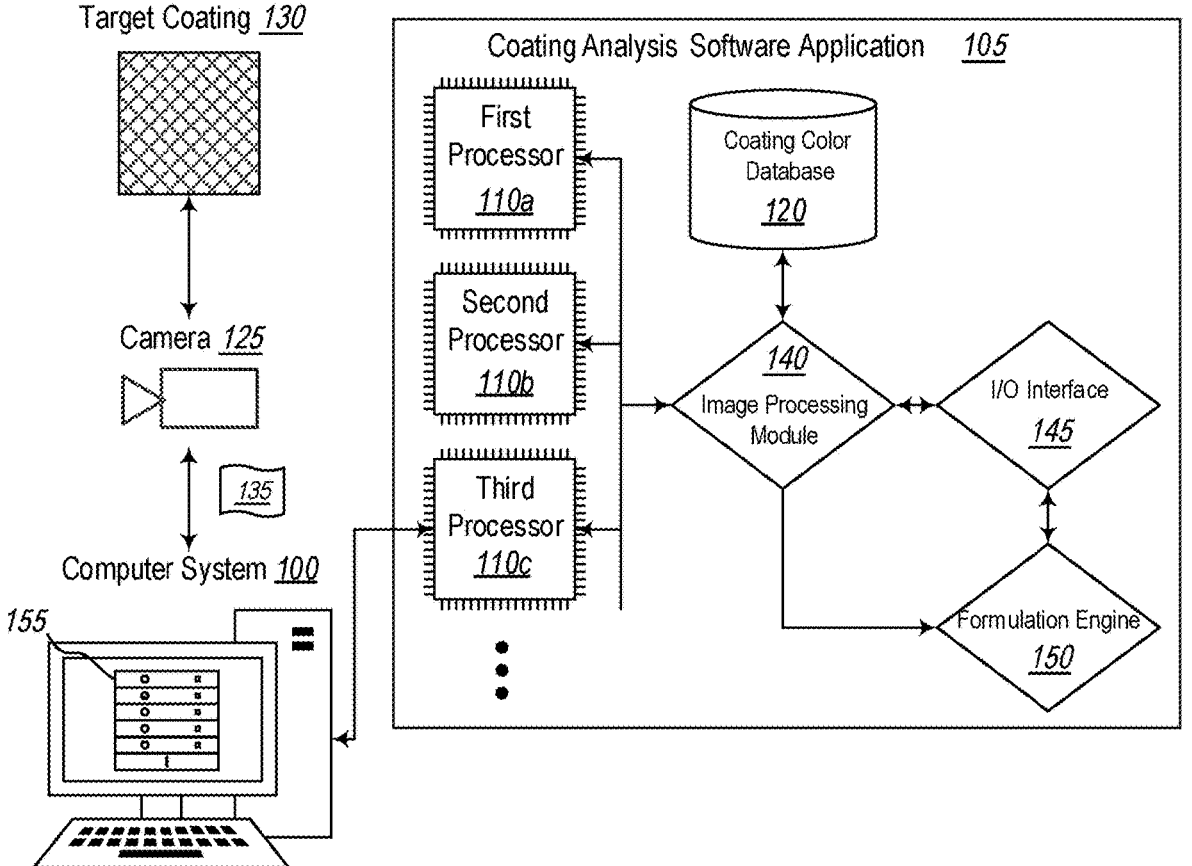
FIG. 1 illustrates a schematic diagram of a computerized system for comparing complex coating mixtures with sparkle color in accordance with an embodiment of the present invention.

The systems, methods, and computer program products described herein can provide significant improvements to coating formulation methods. For example, the present invention includes a system for comparing complex coating mixtures with sparkle color. The present invention also includes computer-implemented methods of comparing complex coating mixtures with sparkle color, and related computer-program products. Accordingly, the computer systems and methods disclosed herein can provide a solution that can identify special effect pigments and generalize the ratios of those pigments, thus enabling faster and better color matching while providing a color match that may be of higher quality.

For example, a computer system for comparing complex coating mixtures with sparkle color can be configured to receive at least one image of a target coating. As used herein, a target coating comprises any coating of interest that has been applied to any physical object. The computer system can also calculate a sparkle color distribution of the at least one image of the target coating, wherein the sparkle color distribution represents a relative number of sparkle points of one color compared to a number of sparkle points of one or more other colors in a measured area. Further, the computer system can search a database for a plurality of reference coatings with sparkle color distributions that match the sparkle color distribution of the target coating, wherein each reference coating in the plurality has a different sparkle color distribution. The computer system can calculate a degree to which the plurality of reference coatings matches the target coating based on sparkle color distribution. Furthermore, the computer system can identify a closest matching reference coating from the plurality of reference coatings.

One skilled in the art will appreciate that automotive coatings provide a particularly challenging set of coating parameters to match. In addition to complex colorants, such as pigments, dyes, and inks, a conventional automotive coating may comprise effect pigments such as effect pigments that provide texture to the coating. For instance, an automotive coating may comprise an effect pigment such as aluminum flakes of a particular color. The aluminum flakes may provide a texture that appears to "sparkle."

In general, the term "sparkle," while being an understood term by one of ordinary skill in the art in the coatings art and related technologies, is understood to mean a small, specific point of shine, glitter, or glistening in a particular area of a coating. Per ASTM E284, "sparkle" means the aspect of the appearance of a material that seems to emit or reveal tiny bright points of light that are strikingly brighter than their immediate surround, and are made more apparent when a minimum of one of the contributors (observer, specimen, light source) is moved. In addition, sparkle can be divided into sparkle grade ($S_g$), sparkle intensity ($S_i$), and sparkle area ($S_a$). "Sparkle area" is the area segment of the illuminated portion of an object surface with spots that are strikingly brighter than their immediate surround. By contrast, "sparkle intensity" is the contrast between the appearance highlights on the particles of a gonio-apparent pigment and their immediate surround. The parameter S i is the summation of the registered intensities of all individual pigments and Sg is defined as the geometric mean of $S_i$ and $S_a$ as follows:

$$S_g = \sqrt{S_i S_a}$$

Although coatings can provide a generalized shine or glisten at various points and angles through the combined effect of all materials in the coating, a sparkle point is a more defined point of shine or glisten provided by a relatively small sub-component of the coating, such as a particular aluminum flake, piece of mica, or other element. Thus, a proper identification of such a coating composition may require the correct identification of the presence of sparkle producing components, such as the amount, type, and distribution of aluminum flakes and a proper identification of the color of the aluminum flakes.

Traditional techniques to evaluate the properties of complex coating mixtures involve using a spectrophotometer (e.g., in-plane multiangle devices for effect samples and spherical devices for straight shade samples). However, new pigments are frequently difficult to adequately characterized using such techniques due to the unique properties of effect materials, such as COLORSTREAM (by MERCK) pearls, colored aluminums, etc. For example, it may be challenging to view, for example, COLORSTREAM pigments, and it may be nearly impossible to see coarseness of colored aluminums. In such a case, therefore, a microscope may be required to adequately determine special effect pigments. Use of a microscope or other instrumentation can be a time consuming process, and may not satisfactorily address application issues which modify the characteristics of the sample and the effect of the special pigments.

In some cases, human experts assist in identifying colorants within a coating by making educated guesses about the specific colorants that may be present in a coating. Unfortunately, even experts with significant color matching experience may have significant difficulty guessing the colorant components within a complex coating. This inaccuracy can be caused, at least in part, where experts are limited to visually matching a combination of colorants selected from a library of hundreds or thousands of colorants that may be present in any given coating.

In contrast to conventional methods, the systems and methods described herein utilize statistical comparison of sparkle color distributions between images, namely photographic images, to find similar coating colors. Such a system provides significant technical improvements over conventional coating formulation methods. For example, at least one system or method described herein can provide accuracy without requiring either a spectrophotometer or microscope to adequately characterize the target coating. In particular, embodiments of the systems and/or methods can employ a basic camera capable of basic magnification to capture an image of the target coating. Further, because systems and methods described herein compare captured image data to known image data, in at least one described system or method, systems and methods of the present invention can provide significant advantages using only one image at one angle to identify similar coating colors.

Thus, the computer systems and methods disclosed and claimed herein can provide a solution that can quickly identify special effect pigments and generalize the ratios of those pigments, thus enabling faster and better color matching while providing a color match that may be of higher quality. Moreover, the coating comparison processes disclosed herein can detect subtle color variances that are not detectable by the human eye. Further the described computer system can increase the speed at which auto body repair shops identify a refinish paint color thereby increasing their productivity.

Turning now to the Figures, FIG. 1 illustrates a schematic diagram of a computerized system in accordance with embodiments of the present invention comprising a computer system 100 for comparing complex coating mixtures with sparkle color. With respect to FIG. 1, the computer system 100 is described in the exemplary context of identifying texture effects, such as aluminum, organic mica, or man-made mica; however, one will appreciate that the computer system 100 could additionally or alternatively be used to identify any type of colorant, effect component (or flake), etc. One skilled in the art will appreciate that the depicted schematic is merely exemplary, and although the computer system 100 is depicted in FIG. 1 as a desktop computer, the computer system 100 can take a variety of forms. For example, the computer system 100 may be a laptop computer, a tablet computer, a wearable device, a mobile phone, a mainframe, etc.

As used herein, a computer system used with the invention comprises any combination of one or more processors 110(*a-c*) and computer-readable storage media (not shown). For example, a processor (e.g., "first processor" 110*a*) may comprise an integrated circuit, a field-programmable gate array (FPGA), a microcontroller, an analog circuit, or any other electronic circuit capable of processing input signals. Examples of computer-readable storage media include RAM, ROM, EEPROM, solid state drives ("SSDs"), flash memory, phase-change memory ("PCM"), optical disk storage, magnetic disk storage or other magnetic storage devices, or any other hardware storage device(s). The computer system 100 may be distributed over a network environment and may include multiple constituent computer systems.

The computer system 100 can comprise one or more computer-readable storage media having stored thereon executable instructions that when executed by the one or more processors 110(a-c) configure the computer system 100 to execute a coating analysis software application 105. Coating analysis can comprise calculating a degree to which the plurality of reference coatings matches the target coating 130 based on sparkle color distribution within the target coating 130.

For example, the coating analysis software application 105 can cause the computer system 100 to receive at least one image 135 of a target coating 130. The image 135 may be captured for example by a camera 125 (as shown in FIG. 1), a spectrophotometer, a smartphone, a microscope, or any other device capable of scanning a target coating 130 and providing characterization data relating to photo/image attributes of the target coating 130. Additionally or alternatively, the image 135 of the target coating 130 comprises RGB values from pixel image data. The image 135 can include associated metadata, including information regarding the camera settings (e.g., magnification, lighting, resolution, camera angle, etc.) For the purposes of this specification and claims, the term "pixel" means the smallest element of an image that can be processed in a video display system, and includes at least the following information: (i) address (e.g., X/Y location data); and (ii) color value and/or light value (e.g., RGB, gamma-RGB, colorimetric, and/or related values). By contrast, a "pixel cluster" comprises a value associated with a group of two or more pixels, wherein the value describes the grouping via an average, mean, or other form of statistical modeling. Thus, a "sparkle color" as used herein can include a single pixel value or a value associated with a pixel cluster.

As shown in FIG. 1, the coating analysis software application 105 may comprise various modules, such as an image processing module 140, an input/output (I/O) interface 145, and a formulation engine 150. As used herein, a module may comprise a software component, including a software object, a hardware component, such as a discrete circuit, a FPGA, a computer processor, or some combination of hardware and software. One will understand, however, that separating modules into discrete units is at least somewhat arbitrary and that modules can be combined, associated, or separated in ways other than shown in FIG. 1 and still accomplish the purposes of the computer system. Accordingly, the modules 140, 145, and 150 of FIG. 1 are only shown for illustrative and exemplary purposes.

The coating analysis software application 105 may also be in communication with one or more databases, as shown in FIG. 1. For example, the coating analysis software application 105 may be in communication with a coating color database 120. As used herein, a database may comprise locally stored data, remotely stored data, data stored within an organized data structure, data stored within a file system, or any other stored data that is accessible to the coating analysis software application 105.

As shown in FIG. 1, the image processing module 140 of the coating analysis software application 105 can be configured to receive the image 135 of the target coating 130, and thereafter determine a sparkle color distribution 300 (see FIG. 3A) of the image 135 of a target coating 130. The image processing module 140 can sharpen the image 135 (or at least a portion of the image 135) of the target coating 130, isolate the high intensity pixels to identify sparkle points, and perform a hue analysis to determine the sparkle colors of the sparkle points, thereby calculating the sparkle color distribution 300.

Figure 2:
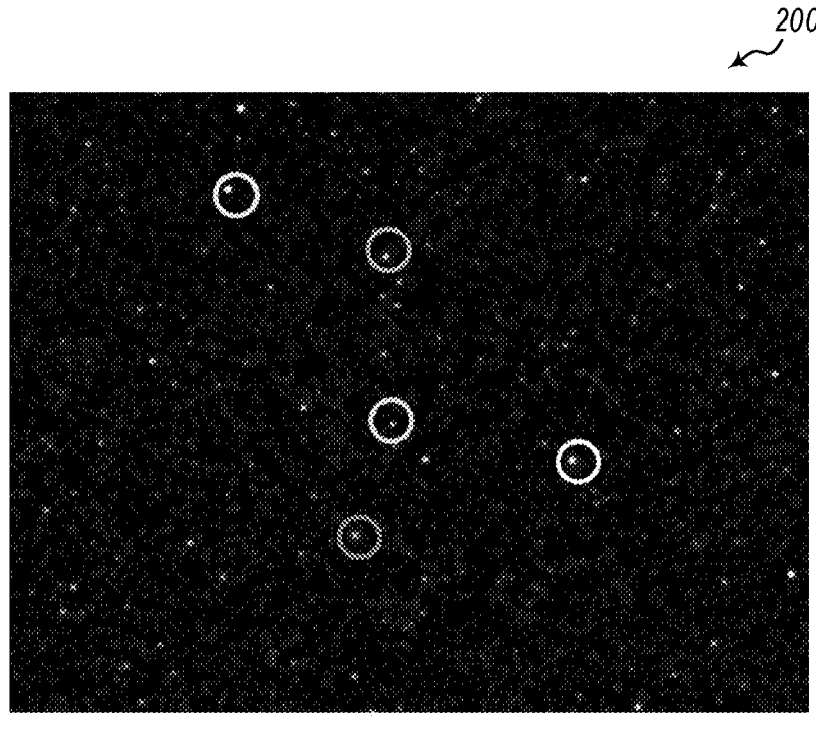
FIG. 2 is an embodiment of an image in which a sample set of sparkle colors has been indicated with circles.

For example, FIG. 2 illustrates a "sparkle-only" image 200 (meaning the image processing module 140 sharpened and isolated high intensity pixels in at least a portion of the image 135), showing a simplified selection. In particular, FIG. 2 illustrates an image that is limited to five different points for illustrative purposes, of sparkle points. The image processing module 140 can be configured to analyze each of the sparkle points to determine the hue of the sparkle point. In FIG. 2, the five sparkle points can include at least one blue, one violet, one green, one red, and one orange sparkle colors.

Figure 3A:
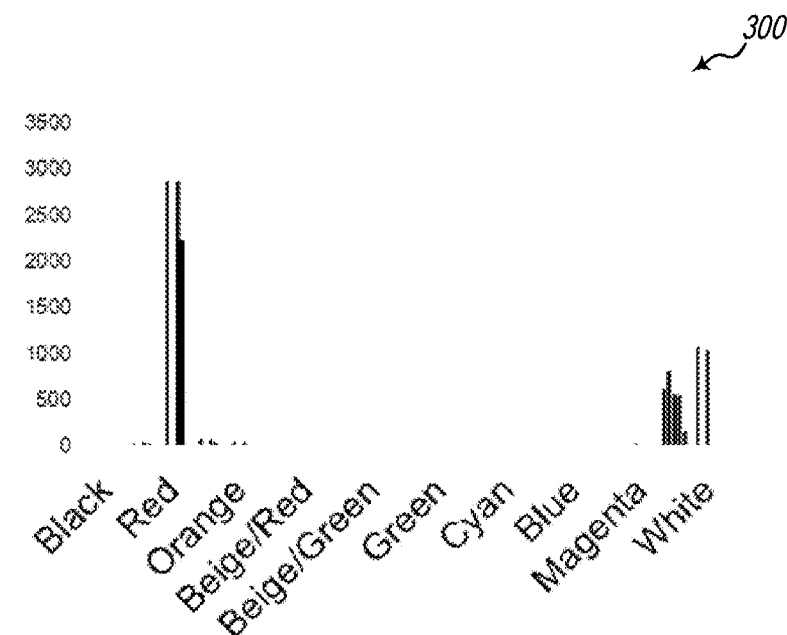
FIG. 3A illustrates a graph of an exemplary sparkle color distribution.
Figure 3B:
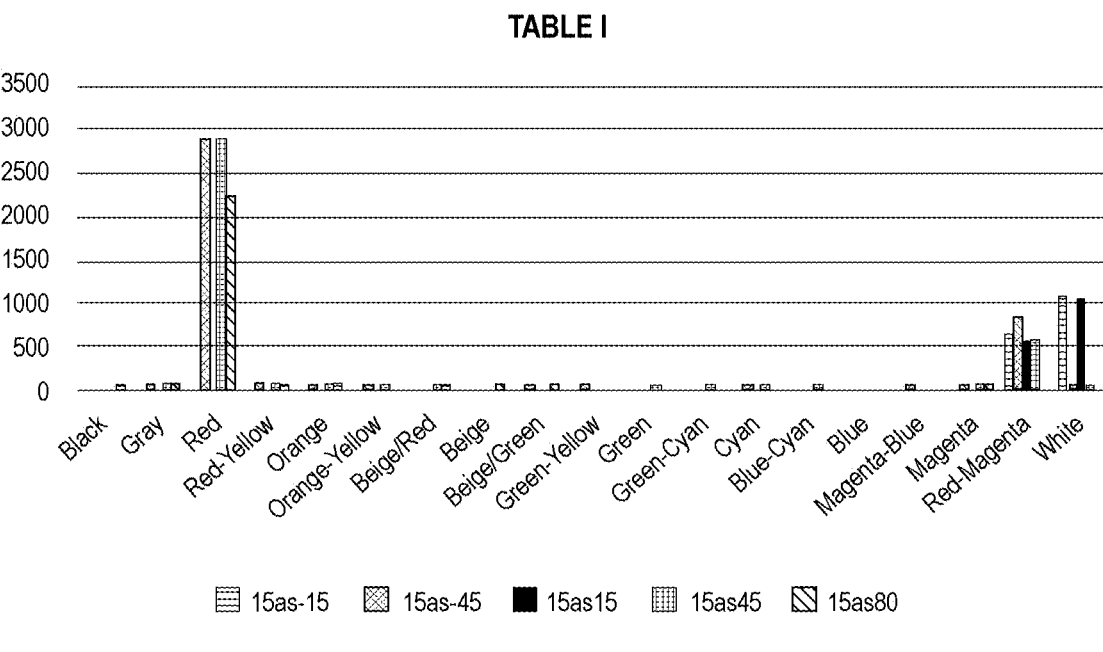
FIG. 3B illustrates another graph of an exemplary sparkle color distribution.
Figure 3C:
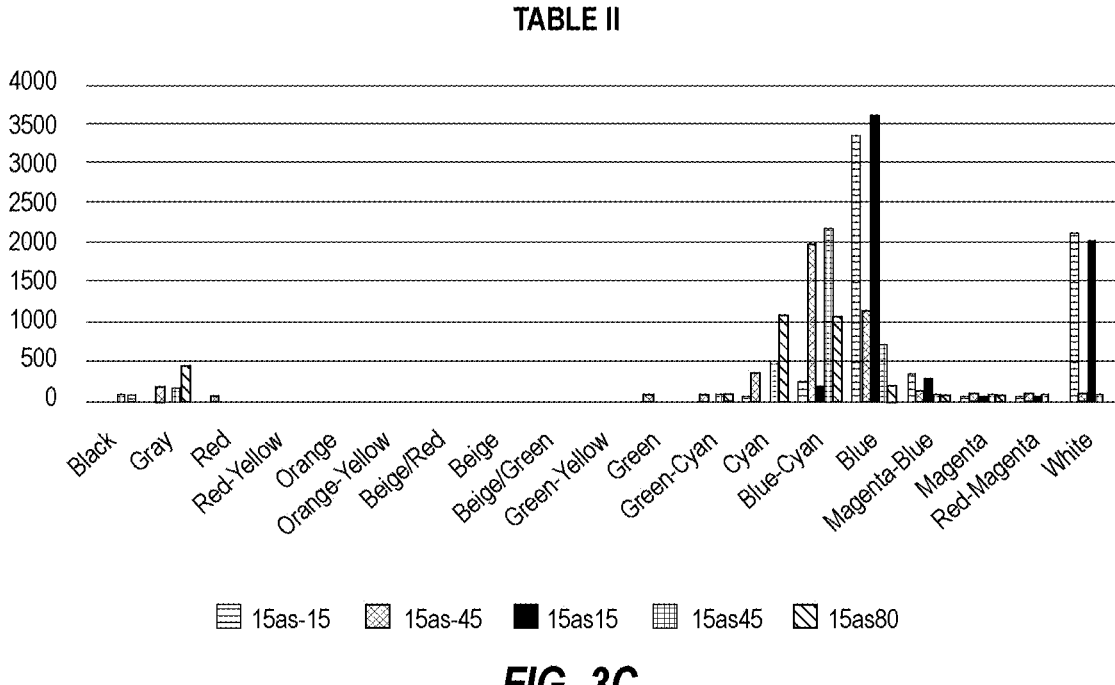
FIG. 3C illustrates still another graph of an exemplary sparkle color distribution.

As shown in FIG. 3A, the data from the analyzed sparkle points can be used to calculate a sparkle color distribution 300, which represents a relative number of sparkle points of one color compared to a number of sparkle points of one or more other colors within the analyzed portion of the image 135. The sparkle color distribution 300 shown in FIG. 3A lists identified colors on the x-axis, and each identified color's pixel count on the y-axis. Although FIG. 3A shows the sparkle color distribution 300 graphically, the coating analysis software application 105 can additionally or alternatively store the data numerically. One skilled in the art will appreciate that the colors and pixel counts shown in FIG. 3A are merely exemplary. FIGS. 3B to 3C corresponding to Tables I and II provide further graphs of pixel count relative to listed color of various target samples.

Referring again to FIG. 1, once the image processing module 140 calculates the sparkle color distribution 300, the image processing module 140 can search the coating color database 120 for reference coatings with sparkle color distributions that match the sparkle color distribution 300 of the target coating 130. The coating color database 120 can include sparkle color distribution numerical data for known coating formulations. The coating color database 120 can include other metadata associated with the sparkle color distribution data for each known coating formulation. For example, the metadata can include information regarding the camera settings (e.g., magnification, lighting, resolution, camera angle, etc.) for the image used to calculate the sparkle color distribution data for the coating formulation.

The image processing module 140 can be configured to compare the sparkle color distribution 300 of the image-only (135) with sparkle color distribution data within the coating color database 120 captured from images with similar associated metadata. For example, if the image 135 is captured at a first angle, then the image processing module 140 can search the coating color database 120 for reference coatings with sparkle color distributions from images also captured from that first angle. Additionally or alternatively, if a specific camera magnification is used to capture the target coating 130 in the image 135, then the image processing module 140 can search the coating color database 120 for reference coatings with sparkle color distributions from images that comprise the same camera magnification.

In at least one method described herein, at least one additional image of the target coating 130 is captured from at least one additional angle. The image processing module 140 can calculate a sparkle color distribution from the additional image of the target coating 130 at the additional angle. The image processing module 140 can be configured to use both the sparkle color distribution of the target coating 130 at the first angle, and the sparkle color distribution of the target coating 130 at the additional angle to search the database for similar coating references.

The image processing module 140 shown in FIG. 1 can also be configured to identify a "reverse sparkle color" of the image 135 of the target coating 130. As used herein, "reverse sparkle color" means the background color, namely the color of the panel separable from the color of the sparkles themselves. The reverse sparkle color can be identified by isolating the high intensity pixels in the image 135 (or in at least a portion of the image 135) and deselecting the isolated high intensity pixels. The image processing module 140 can search the coating color database 120 based on the reverse sparkle color for reference coatings that match the target coating 130. In order to narrow search results, the image processing module 140 can first use the reverse sparkle color to search the coating color database 120 for matching reference coatings before searching using the calculated sparkle color distribution 300.

The image processing module 140 can then calculate a degree to which the reference coatings matches the target coating 130 by statistically comparing their sparkle color distributions. A z-score analysis can provide an opportunity to give a quantitative decision on the alignment of sparkling effect pigments between the target coating and an analyzed reference coating. Additionally or alternatively, the z-score analysis can provide an additional test metric for a search methodology, wherein a similar effect containing panel is found even if the overall appearance is outside of visual tolerances. In one embodiment, the image processing module 140 can use the z-score analysis to compare each color within the sparkle color distribution 300 of the image 135 with the corresponding color in a sparkle color distribution of a reference coating to assign a z-score for each color. The following z-score formula can be used, which compares two proportions rather than absolute values:

$$z = \frac{(\hat{p}_1 - \hat{p}_2) - 0}{\sqrt{\hat{p}(1-\hat{p})\left[\frac{1}{n_1} + \frac{1}{n_2}\right]}}$$

where z is the z-score, $\hat{p}_1$ is the proportion for a first coating of pixels for an individual color over total pixels for all colors, $\hat{p}_2$ is the proportion for a second coating of pixels for the individual color over total pixels for all colors, $\hat{p}$ is the proportion of pixels of the individual color in both coatings over the total number of pixels in both coatings, $n_1$ is the total number of pixels in the first coating, and $n_2$ is the total number of pixels in the second coating.

Figure 3D:
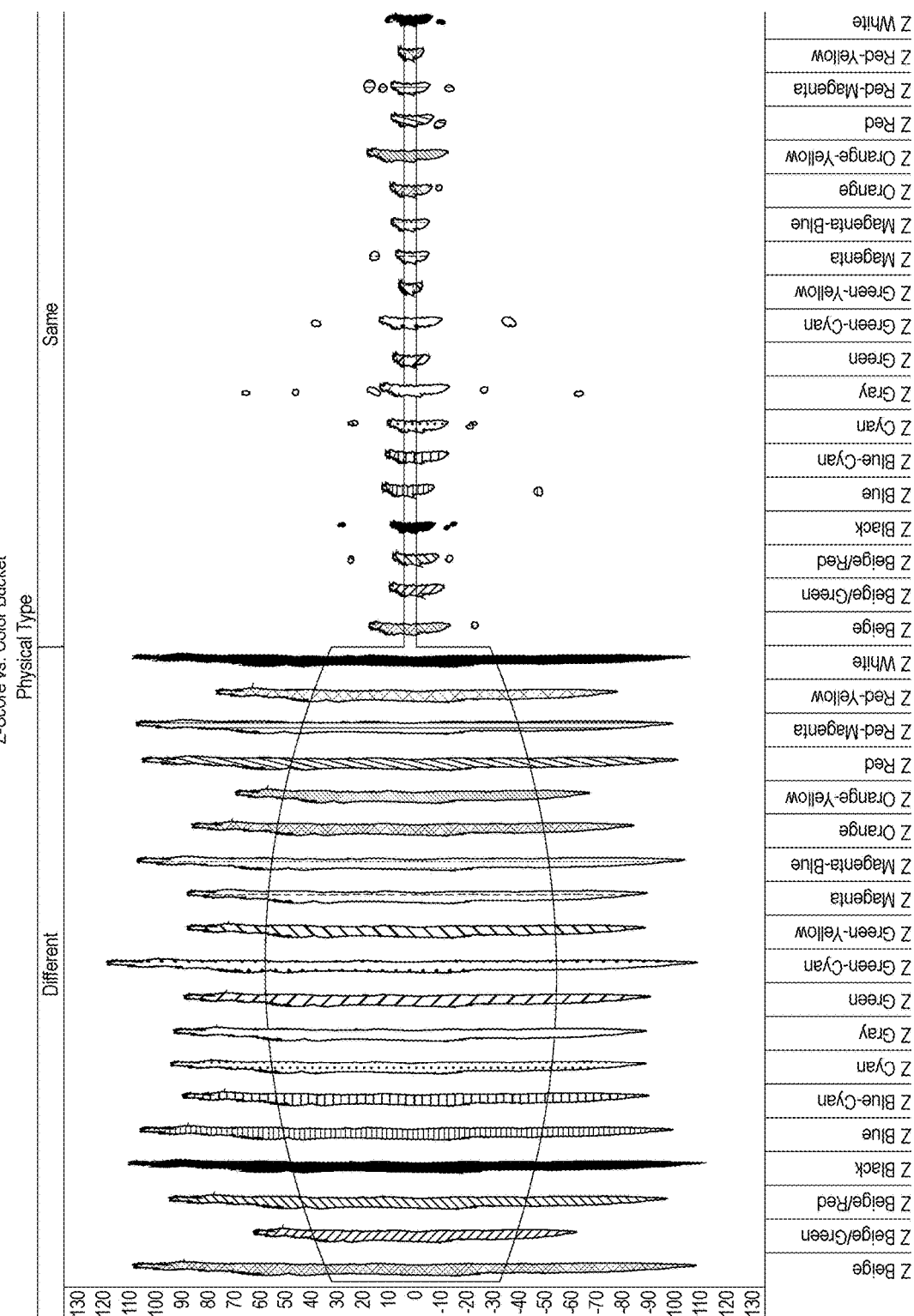
FIG. 3D illustrates a graph plotting colors versus z-score.

A threshold of acceptability for each color comparison can be set by a user. The z-score threshold can remain constant or the user can alter the threshold according to the quality of the pixel image data. Based on the z-scores analysis, the image processing module 140 can identify a degree to which the target coating 130 matches the analyzed reference coating. If the z-score of at least one analyzed color falls outside the z-score threshold, the image processing module 140 can determine that the target coating and analyzed reference coating are likely to be significantly different. The degree of matching can be expressed in a percentage. For example, FIG. 3D illustrates Table III, which plots color match versus z-score. FIG. 3D shows in the "different" category a set of color matches across a large spectrum of z-score, meaning that the match to color is imprecise. By contrast, Table III illustrates on the right side a plot of more precise color matches, as evident by the tighter range of z-scores.

In contrast with conventional analytic methods, at least one embodiment of the present invention provides for using a comparatively wide threshold value for determining matches. While this can yield low match ratings between actual, observed colors of the target sample/background (i.e., the reverse sparkle colors), a broad z-score value can at the same time find reference coating that have at least similar colors but more closely matching sub-component compositions, and concentrations thereof. In other words, the z-score can be set essentially to focus on non-sparkle-specific aspects, and then allow color values to be fine-tuned afterward. For example, if the target coating 130 comprises a red reverse sparkle color and the analyzed target coating comprises a reverse sparkle color that does not match the reverse sparkle color of the target coating 130 (e.g., another shade of red or white), the image processing module 140 can be configured to allow the z-scores of at least one of the analyzed colors to exceed the threshold. Thus, the image processing module can calculate a degree to which the sparkling effect pigments of the reference coatings match the sparkling effect pigments of the target coating 130.

The image processing module 140 can generate a list 400 (shown in FIG. 4) of closest matching sparkle color distributions for the reference coatings compared to the sparkle color distribution 300 of the target coating 130. Further, the image processing module 140 can use the closest matching sparkle color distributions to select a closest matching reference coating.

As shown in FIG. 1, once the computer system 100 completes generating the list 400 of closest matching sparkle color distributions for the plurality of reference coatings, the coating analysis software application 105 within the computer system 100 may provide the list 400 to an end user through an input/output (I/O) interface 145. The I/O interface 145 may cause a computer to display the list 400 on a graphical user interface 155 (shown in FIG. 4).

Figure 4:
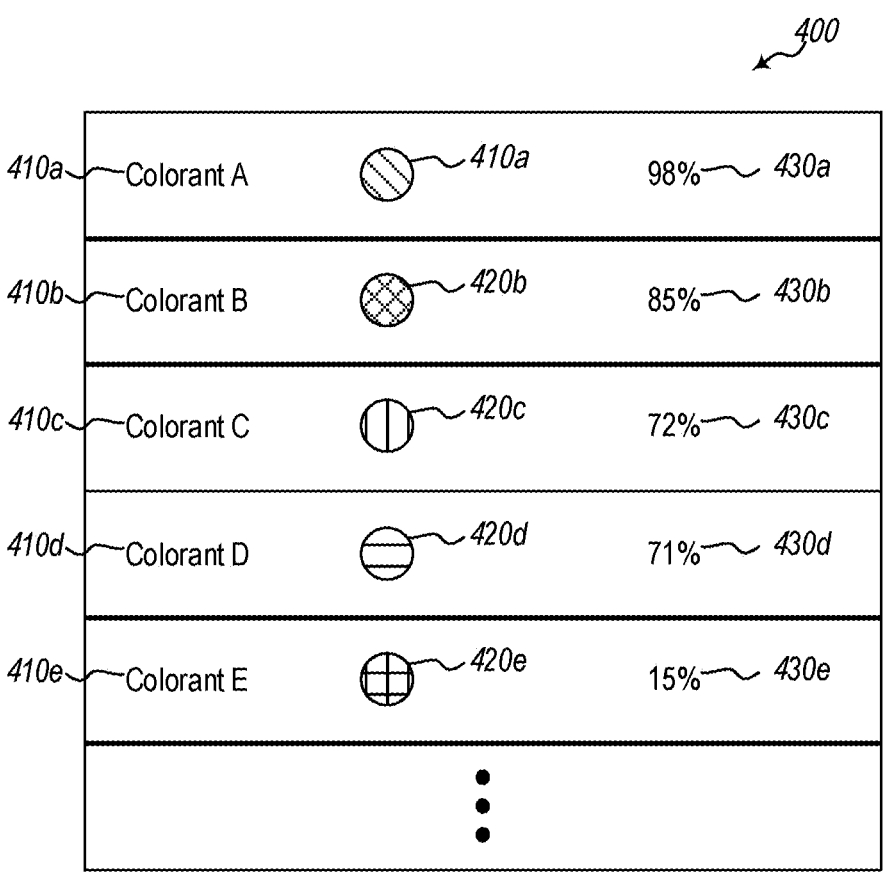
FIG. 4 depicts a schematic of a graphical user interface of a list of closest matching reference coatings sparkle color distributions.

As shown in FIG. 4, the graphical user interface 155 may list the reference coatings in order of highest probability. The list 400 may comprise a name 410*a*-410*e* and image 420*a*-420*e* of each reference coating so that a user can visually compare the depicted colorant images with the target coating 130. Additionally, the graphical user interface 155 can display the calculated relatedness percentage 430*a*-430*e* on the graphical user interface 155.

As shown in FIG. 1, the formulation engine 150 can be in communication with both the image processing module 140 and the I/O interface 145. The formulation engine 150 can generate a coating adjustment formulation to adjust the closet matching reference coating to the target coating. The coating adjustment formulation can also generate a list of toners. The formulation engine 150 may be configurable to send the coating adjustment formulation to the I/O interface 145. The I/O interface 145 can then display the coating adjustment formulation to the end user and/or communicate the coating adjustment formulation to a coating mixing machine in communication with the computer system for production.

In at least some systems and methods described herein, the sparkle color distribution 300 of the image 135 can be compared to sparkle color distributions of reference coatings within the coating color database 120 without filtering according to the reverse sparkle color. Therefore, the coating adjustment formulation can include altering the reverse sparkle color of the closet matching reference coating. For example, if the target coating 130 comprises a red reverse sparkle color, and the closest matching reference coating comprises a white reverse sparkle color, the coating adjustment formulation can involve altering the reverse sparkle color of the closest matching reference coating from white to red. In this way, the sub-components of the coating resulting in sparkle and other effects can be preserved while only the toner related to color is adjusted.

Figure 5:
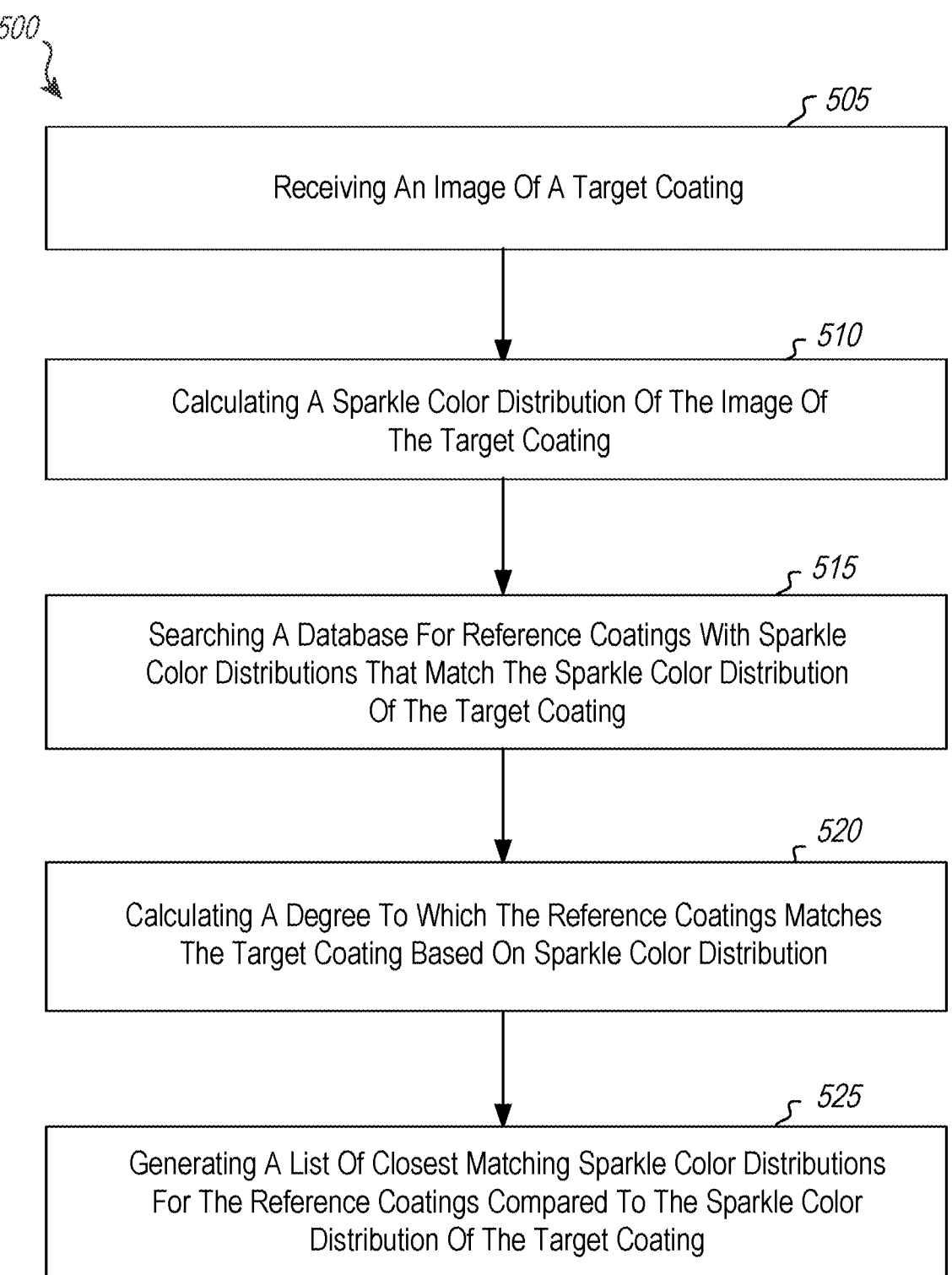
FIG. 5 depicts a flow chart of steps within a method for comparing complex coating mixtures with sparkle color.

FIG. 5 illustrates a method 500 for comparing complex coating mixtures with sparkle color. As shown in FIG. 5, act 505 comprises receiving an image of a target coating. Act 505 includes receiving at least one image of a target coating. For example, as depicted in FIG. 1, the coating analysis software application 105 can cause the computer system 100 to receive the image 135 of a target coating 130. The image 135 may be captured for example by a camera 125 (as shown in FIG. 1), a spectrophotometer, a smartphone, a microscope, or any other device capable of scanning a target coating 130 and providing characterization data relating to attributes of the target coating 130. Additionally or alternatively, the image 135 of the target coating 130 comprises RGB values from pixel image data. The image 135 can include associated metadata, including information regarding the camera settings (e.g., magnification, lighting, resolution, camera angle, etc.)

As shown in FIG. 5, act 510 comprises calculating a sparkle color distribution of the image of the target coating. Act 510 includes calculating a sparkle color distribution of the at least one image of the target coating, wherein the sparkle color distribution represents a relative number of sparkle points of one color compared to a number of sparkle points of one or more other colors in a measured area.

For example, FIG. 3 shows that the data from the analyzed sparkle points can be used to calculate a sparkle color distribution 300, which represents a relative number of sparkle points of one color compared to a number of sparkle points of one or more other colors within the analyzed portion of the image 135. The sparkle color distribution 300 shown in FIG. 3 lists identified colors on the x-axis, and each identified color's pixel count on the y-axis. Although FIG. 3 shows the sparkle color distribution 300 graphically, the coating analysis software application 105 can additionally or alternatively store the data numerically. One skilled in the art will appreciate that the colors and pixel counts shown in FIG. 3 are merely exemplary.

Method 500 can also include act 515, which comprises searching a database for reference coatings with sparkle color distributions that match the sparkle color distribution of the target coating. Act 515 includes searching a database for a plurality of reference coatings with sparkle color distributions that match the sparkle color distribution of the target coating, wherein each reference coating in the plurality has a different sparkle color distribution.

For example, FIG. 1 shows how once the image processing module 140 calculates the sparkle color distribution 300, the image processing module 140 can search the coating color database 120 for reference coatings with sparkle color distributions that match the sparkle color distribution 300 of the target coating 130. The coating color database 120 can include sparkle color distribution numerical data for known coating formulations. The coating color database 120 can include other metadata associated with the sparkle color distribution data for each known coating formulation. For example, the metadata can include information regarding the camera settings (e.g., magnification, lighting, resolution, camera angle, etc.) for the image used to calculate the sparkle color distribution data for the coating formulation.

The image processing module 140 can be configured to compare the sparkle color distribution 300 of the image-only 135 with sparkle color distribution data within the coating color database 120 captured from images with similar associated metadata. For example, if the image 135 is captured at a first angle, then the image processing module 140 can search the coating color database 120 for reference coatings with sparkle color distributions from images also captured from that first angle. Additionally or alternatively, if a specific camera magnification is used to capture the target coating 130 in the image 135, then the image processing module 140 can search the coating color database 120 for reference coatings with sparkle color distributions from images that comprise the same camera magnification.

FIG. 5 further shows that act 520 comprises calculating a degree to which the reference coatings match the target coating based on sparkle color distribution. Act 520 includes calculating a degree to which the plurality of reference coatings matches the target coating based on sparkle color distribution. For example, the image processing module 140 can use a z-score analysis to compare each color within the sparkle color distribution 300 of the image 135 with the corresponding color in a sparkle color distribution of a reference coating to assign a z-score for each color. A threshold of acceptability for each color comparison can be set by a user. The z-score threshold can remain constant or the user can alter the threshold according to the quality of the pixel image data. Based on the z-scores analysis, the image processing module 140 can identify a degree to which the target coating 130 matches the analyzed reference coating. The degree of matching can be expressed in a percentage.

Finally, method 500 can include act 525, which comprises generating a list of closest matching sparkle color distributions for the reference coatings compared to the sparkle color distribution of the target coating. Act 525 includes generating a list of closest matching sparkle color distributions for the plurality of reference coatings compared to the sparkle color distribution of the target coating.

For example, FIG. 4 shows a list 400 (e.g., generated by that the image processing module 140) of closest matching sparkle color distributions for the reference coatings compared to the sparkle color distribution 300 of the target coating 130. The graphical user interface 155 may list the reference coatings in order of highest probability. The list 400 may comprise a name 410a-410e and image 420a-420e of each reference coating so that a user can visually compare the depicted colorant images with the target coating 130. Additionally, the graphical user interface 155 can display the calculated relatedness percentage 430a-430e on the graphical user interface 155.

FIG. 6 illustrates an alternative method 600 for comparing complex coating mixtures with sparkle color than the method 500 shown in FIG. 5. As shown in FIG. 6, act 605 comprises receiving an image of a target coating. Act 605 includes receiving at least one image of a target coating comprising RGB values from pixel image data. For example, as depicted in FIG. 1, the coating analysis software application 105 can cause the computer system 100 to receive the image 135 of a target coating 130. The image 135 may be captured for example by a camera 125 (as shown in FIG. 1), a spectrophotometer, a smartphone, a microscope, or any other device capable of scanning a target coating 130 and providing characterization data relating to attributes of the target coating 130. Additionally or alternatively, the image 135 of the target coating 130 comprises RGB values from pixel image data. The image 135 can include associated metadata, including information regarding the camera settings (e.g., magnification, lighting, resolution, camera angle, etc.)

As shown in FIG. 6, act 610 comprises calculating a sparkle color distribution of the image of the target coating. Act 610 includes calculating a sparkle color distribution of the at least one image of the target coating, wherein the sparkle color distribution represents a relative number of sparkle points of one color compared to a number of sparkle points of one or more other colors in a measured area.

For example, FIG. 3 shows that the data from the analyzed sparkle points can be used to calculate a sparkle color distribution 300, which represents a relative number of sparkle points of one color compared to a number of sparkle points of one or more other colors within the analyzed portion of the image 135. The sparkle color distribution 300 shown in FIG. 3 lists identified colors on the x-axis, and each identified color's pixel count on the y-axis. Although FIG. 3 shows the sparkle color distribution 300 graphically, the coating analysis software application 105 can additionally or alternatively store the data numerically. One skilled in the art will appreciate that the colors and pixel counts shown in FIG. 3 are merely exemplary.

Method 600 can also include act 615, which comprises searching a database for reference coatings with sparkle color distributions that match the sparkle color distribution of the target coating. Act 615 includes searching a database for a plurality of reference coatings with sparkle color distributions that match the sparkle color distribution of the target coating, wherein each reference coating in the plurality has a different sparkle color distribution.

For example, FIG. 1 shows how once the image processing module 140 calculates the sparkle color distribution 300, the image processing module 140 can search the coating color database 120 for reference coatings with sparkle color distributions that match the sparkle color distribution 300 of the target coating 130. The coating color database 120 can include sparkle color distribution numerical data for known coating formulations. The coating color database 120 can include other metadata associated with the sparkle color distribution data for each known coating formulation. For example, the metadata can include information regarding the camera settings (e.g., magnification, lighting, resolution, camera angle, etc.) for the image used to calculate the sparkle color distribution data for the coating formulation.

The image processing module 140 can be configured to compare the sparkle color distribution 300 of the image-only 135 with sparkle color distribution data within the coating color database 120 captured from images with similar associated metadata. For example, if the image 135 is captured at a first angle, then the image processing module 140 can search the coating color database 120 for reference coatings with sparkle color distributions from images also captured from that first angle. Additionally or alternatively, if a specific camera magnification is used to capture the target coating 130 in the image 135, then the image processing module 140 can search the coating color database 120 for reference coatings with sparkle color distributions from images that comprise the same camera magnification.

FIG. 6 further shows that act 620 comprises calculating using a z-score analysis a degree to which the reference coatings match the target coating based on sparkle color distribution. Act 620 includes calculating using a z-score analysis a degree to which the plurality of reference coatings match the target coating based on sparkle color distribution. For example, the image processing module 140 can use a z-score analysis to compare each color within the sparkle color distribution 300 of the image 135 with the corresponding color in a sparkle color distribution of a reference coating to assign a z-score for each color. A threshold of acceptability for each color comparison can be set by a user. The z-score threshold can remain constant or the user can alter the threshold according to the quality of the pixel image data. Based on the z-scores analysis, the image processing module 140 can identify a degree to which the target coating

130 matches the analyzed reference coating. The degree of matching can be expressed in a percentage.

Finally, method 600 can include act 625, which comprises generating a list of closest matching sparkle color distributions for the reference coatings compared to the sparkle color distribution of the target coating. Act 625 includes generating a list of closest matching sparkle color distributions for the plurality of reference coatings compared to the sparkle color distribution of the target coating.

For example, FIG. 4 shows a list 400 (e.g., generated by that the image processing module 140) of closest matching sparkle color distributions for the reference coatings compared to the sparkle color distribution 300 of the target coating 130. The graphical user interface 155 may list the reference coatings in order of highest probability. The list 400 may comprise a name 410*a*-410*e* and image 420*a*-420*e* of each reference coating so that a user can visually compare the depicted colorant images with the target coating 130. Additionally, the graphical user interface 155 can display the calculated relatedness percentage 430*a*-430*e* on the graphical user interface 155.

Accordingly, one will appreciate in view of the present specification, aspects, and claims that embodiments of the present invention provide a number of clear advantages in the art. For example, the systems and methods described herein utilize statistical comparison of sparkle color distributions between images to find similar coating colors. At least one system or method described herein can provide accuracy without requiring either a spectrophotometer or microscope to adequately characterize the target coating. Systems and methods described herein can employ a basic camera capable of basic magnification to capture an image of the target coating. Further, because systems and methods described herein compare captured image data to known image data, in at least one described system or method, systems and methods of the present invention can provide significant advantages using only one image at one angle to identify similar coating colors.

Thus, the computer systems and methods disclosed and claimed herein can provide a solution that can quickly identify special effect pigments and generalize the ratios of those pigments, thus enabling faster and better color matching while providing a color match that may be of higher quality. Moreover, the coating comparison processes disclosed herein can detect subtle color variances that are not detectable by the human eye.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The computer system may comprise or utilize a special-purpose or general-purpose computer system that includes computer hardware, such as, for example, one or more processors and system memory, as discussed in greater detail below. The computer system can also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the computer system can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the computer system.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the computer system may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The computer system may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the computer system may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

A cloud-computing environment may comprise a system that includes one or more hosts that are each capable of running one or more virtual machines. During operation, virtual machines emulate an operational computing system, supporting an operating system and perhaps one or more other applications as well. Each host may include a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

In view of the foregoing the present computer system relates for example, without being limited thereto, to the following aspects:

1. A computer system for comparing complex coating mixtures with sparkle color, comprising:

one or more processors; and one or more computer-readable media having stored thereon executable instructions that when executed by the one or more processors configure the computer system to perform at least the following:

receive at least one image of a target coating;

calculate a sparkle color distribution of the at least one image of the target coating, wherein the sparkle color distribution represents a relative number of sparkle points of one color compared to a number of sparkle points of one or more other colors in a measured area;

search a database for a plurality of reference coatings with sparkle color distributions that match the sparkle color distribution of the target coating, wherein each reference coating in the plurality has a different sparkle color distribution;

calculate a degree to which the plurality of reference coatings matches the target coating based on sparkle color distribution; and identify a closest matching reference coating from the plurality of reference coatings.

2. The computer system according to aspect 1, wherein the sparkle color distribution represents a relative number of sparkle points of each individual color compared to the number of sparkle points of one or more other colors in a measured area.

3. The computer system according to any of aspects 1 or 2, wherein the executable instructions include instructions that are executable to configure the computer system to:

identify a reverse sparkle color of the at least one image of the target coating; and wherein searching the database for a plurality of reference coatings further considers the reverse sparkle color for a plurality of reference coatings that match the reverse sparkle color of the target coating according to aspects 4 to 6.

4. The computer system according to any one of aspects 1 or 3, wherein the executable instructions include instructions that are executable to configure the computer system to generate a coating adjustment formulation to adjust the closet matching reference coating to the target coating.

5. The computer system according to any one of aspects 1 to 4, wherein calculating the sparkle color distribution from the at least one image of the target coating comprises:

analyzing the at least one image of the target coating to identify at least one sparkle point; and point.

performing a hue analysis to determine a sparkle color of the at least one sparkle 6. The computer system according to any one of aspects 1 to 5, wherein the at least one image of the target coating is captured by a spectrophotometer, camera, smartphone, microscope, or other image-capture device.

7. The computer system according to any one of aspects 1 to 6, wherein the executable instructions include instructions that are executable to configure the computer system to generate a list of the closest matching sparkle color distributions for the plurality of reference coatings compared to the sparkle color distribution of the target coating.

8. The computer system according to aspect 4 or aspects 5 to 7 referring to aspect 4, wherein generating the coating adjustment formulation comprises generating a list of toners.

9. A computerized method for use on a computer system comprising one or more processors and one or more computer-readable media having stored thereon executable instructions that when executed by the one or more processors configure the computer system to perform a method of comparing complex coating mixtures with sparkle color, for instance on a computer system as defined in aspects 1 to 8, the method comprising:

receiving at least one image of a target coating;

calculating a sparkle color distribution of the at least one image of the target coating, wherein the sparkle color distribution represents a relative number of sparkle points of one color compared to a number of sparkle points of one or more other colors in a measured area;

searching a database for a plurality of reference coatings with sparkle color distributions that match the sparkle color distribution of the target coating, wherein each reference coating in the plurality has a different sparkle color distribution;

calculating a degree to which the plurality of reference coatings matches the target coating based on sparkle color distribution; and

generating a list of closest matching sparkle color distributions for the plurality of reference coatings compared to the sparkle color distribution of the target coating.

10. The method according to aspect 9, wherein:

the at least one image of the target coating is captured at a first angle; and the database contains sparkle color distributions for images of reference coatings captured at more than one angle.

11. The method according to any one of aspects 9 or 10, wherein searching the database further comprises searching the database for the plurality of reference coatings with sparkle color distributions from images captured at the first angle that match the sparkle color distribution of the target coating captured at the first angle.

12. The method according to any one of aspects 9 to 11, further comprising:

receiving at least one additional image of the target coating captured at least one additional angle;

calculating a sparkle color distribution from the at least one additional image of the target coating captured at the at least one additional angle; and searching the database for an additional plurality of reference coatings with sparkle color distributions from images captured at the at least one additional angle that match the sparkle color distribution of the additional image of the target coating captured at the at least one additional angle.

13. The method according to any one of aspects 9 to 12, wherein the at least one image of the target coating is captured by a camera.

14. The method according to any one of aspects 9 to 13, wherein the at least one image of the target coating comprises RGB values from pixel image data.

15. The method according to any one of aspects 9 to 14, further comprising using the closest matching sparkle color distributions to select a closest matching reference coating.

16. The method according to aspect 15, further comprising generating a coating adjustment formulation to adjust the closet matching reference coating to the target coating.

17. The computerized method according to any one of aspects 9 to 16, further comprising:

analyzing the at least one image of the target coating to identify at least one sparkle point; and performing a hue analysis to determine a sparkle color of the at least one sparkle point.

18. A computerized method for use on a computer system or the method according to any one of aspects 9 to 17 comprising one or more processors and one or more computer-readable media having stored thereon executable instructions that when executed by the one or more processors configure the computer system to perform a method of comparing complex coating mixtures with sparkle color, for instance on a computer system as defined in aspects 1 to 8, the method comprising:

receiving at least one image of a target coating comprising RGB values from pixel image data;

calculating a sparkle color distribution of the at least one image of the target coating, wherein the sparkle color distribution represents a relative number of sparkle points of one color compared to a number of sparkle points of one or more other colors in a measured area;

searching a database for a plurality of reference coatings with sparkle color distributions that match the sparkle color distribution of the target coating;

calculating using a z-score analysis a degree to which the plurality of reference coatings matches the target coating based on sparkle color distribution; and generating a list of closest matching sparkle color distributions for the plurality of reference coatings compared to the sparkle color distribution of the target coating.

19. The method according to aspect 18, wherein quality of the pixel image data affects a threshold set in the z-score analysis.

20. The method according to any one of aspects 18 or 19, further comprising using the closest matching sparkle color distributions to select a closest matching reference coating.

21. The method according to any one of aspects 18 to 20, wherein the z-score analysis uses the following z-score formula:

$$z = \frac{(\hat{p}_1 - \hat{p}_2) - 0}{\sqrt{\hat{p}(1-\hat{p})\left[\frac{1}{n_1} + \frac{1}{n_2}\right]}}$$

where z is the z-score, $\hat{p}_1$ is the proportion for a first coating of pixels for an individual color over total pixels for all colors, $\hat{p}_2$ is the proportion for a second coating of pixels for the individual color over total pixels for all colors, $\hat{p}$ is the proportion of pixels of the individual color in both coatings over the total number of pixels in both coatings, n 1 is the total number of pixels in the first coating, and $n_2$ is the total number of pixels in the second coating.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

We claim:

1. A computer system for comparing complex coating mixtures with sparkle color, comprising:

one or more processors; and one or more computer-readable media having stored thereon executable instructions that when executed by the one or more processors configure the computer system to perform at least the following:

receive at least one image of a target coating;

calculate a sparkle color distribution of the at least one image of the target coating, wherein the sparkle color distribution represents a relative number of sparkle points of one color compared to a number of sparkle points of one or more other colors in a measured area;

search a database for a plurality of reference coatings with sparkle color distributions that match the sparkle color distribution of the target coating, wherein each reference coating in the plurality of reference coatings has a different sparkle color distribution;

calculate a degree to which the plurality of reference coatings matches the target coating based on sparkle color distribution; and identify a closest matching reference coating from the plurality of reference coatings.

2. The computer system of claim 1, wherein the sparkle color distribution represents a relative number of sparkle points of each individual color compared to the number of sparkle points of one or more other colors in a measured area.

3. The computer system of claim 1, wherein the executable instructions include instructions that are executable to configure the computer system to:

identify a reverse sparkle color of the at least one image of the target coating; and wherein searching the database for a plurality of reference coatings further considers the reverse sparkle color for a plurality of reference coatings that match the reverse sparkle color of the target coating.

4. The computer system of claim 1, wherein the executable instructions include instructions that are executable to configure the computer system to generate a coating adjustment formulation to adjust the closest matching reference coating to the target coating.

5. The computer system of claim 4, wherein generating the coating adjustment formulation comprises generating a list of toners.

6. The computer system of claim 1, wherein calculating the sparkle color distribution from the at least one image of the target coating comprises:

analyzing the at least one image of the target coating to identify at least one sparkle point; and performing a hue analysis to determine a sparkle color of the at least one sparkle point.

7. The computer system of claim 1, wherein the at least one image of the target coating is captured by a spectrophotometer, camera, smartphone, microscope, or other image-capture device.

8. The computer system of claim 1, wherein the executable instructions include instructions that are executable to configure the computer system to generate a list of the closest matching sparkle color distributions for the plurality of reference coatings compared to the sparkle color distribution of the target coating.

9. A computerized method for use on a computer system comprising one or more processors and one or more computer-readable media having stored thereon executable instructions that when executed by the one or more processors configure the computer system to perform a method of comparing complex coating mixtures with sparkle color, the method comprising:

receiving at least one image of a target coating;

calculating a sparkle color distribution of the at least one image of the target coating, wherein the sparkle color distribution represents a relative number of sparkle points of one color compared to a number of sparkle points of one or more other colors in a measured area;

searching a database for a plurality of reference coatings with sparkle color distributions that match the sparkle color distribution of the target coating, wherein each reference coating in the plurality of reference coatings has a different sparkle color distribution;

calculating a degree to which the plurality of reference coatings matches the target coating based on sparkle color distribution; and generating a list of closest matching sparkle color distributions for the plurality of reference coatings compared to the sparkle color distribution of the target coating.

10. The method of claim 9, wherein:

the at least one image of the target coating is captured at a first angle; and the database contains sparkle color distributions for images of reference coatings captured at more than one angle.

11. The method of claim 10, wherein searching the database further comprises searching the database for the plurality of reference coatings with sparkle color distributions from images captured at the first angle that match the sparkle color distribution of the target coating captured at the first angle.

12. The method of claim 11, further comprising:

receiving at least one additional image of the target coating captured at least one additional angle;

calculating a sparkle color distribution from the at least one additional image of the target coating captured at the at least one additional angle; and searching the database for an additional plurality of reference coatings with sparkle color distributions from images captured at the at least one additional angle that match the sparkle color distribution of the additional image of the target coating captured at the at least one additional angle.

13. The method of claim 9, wherein the at least one image of the target coating is captured by a camera.

14. The method of claim 9, wherein the at least one image of the target coating comprises RGB values from pixel image data.

15. The method of claim 9, further comprising using the closest matching sparkle color distributions to select a closest matching reference coating.

16. The method of claim 15, further comprising generating a coating adjustment formulation to adjust the closest matching reference coating to the target coating.

17. The computerized method of claim 16, further comprising:

analyzing the at least one image of the target coating to identify at least one sparkle point; and performing a hue analysis to determine a sparkle color of the at least one sparkle point.

18. A computerized method for use on a computer system comprising one or more processors and one or more computer-readable media having stored thereon executable instructions that when executed by the one or more processors configure the computer system to perform a method of comparing complex coating mixtures with sparkle color, the method comprising:

receiving at least one image of a target coating comprising RGB values from pixel image data;

calculating a sparkle color distribution of the at least one image of the target coating, wherein the sparkle color distribution represents a relative number of sparkle points of one color compared to a number of sparkle points of one or more other colors in a measured area;

searching a database for a plurality of reference coatings with sparkle color distributions that match the sparkle color distribution of the target coating;

calculating using a z-score analysis a degree to which the plurality of reference coatings match the target coating based on sparkle color distribution; and generating a list of closest matching sparkle color distributions for the plurality of reference coatings compared to the sparkle color distribution of the target coating.

19. The method of claim 18, wherein quality of the pixel image data affects a threshold set in the z-score analysis.

20. The method of claim 18, further comprising using the closest matching sparkle color distributions to select a closest matching reference coating.

* * * * *